Aug. 3, 1926.
H. D. TAYLOR
CAR TRUCK
Filed May 16, 1924     2 Sheets-Sheet 1
1,594,576
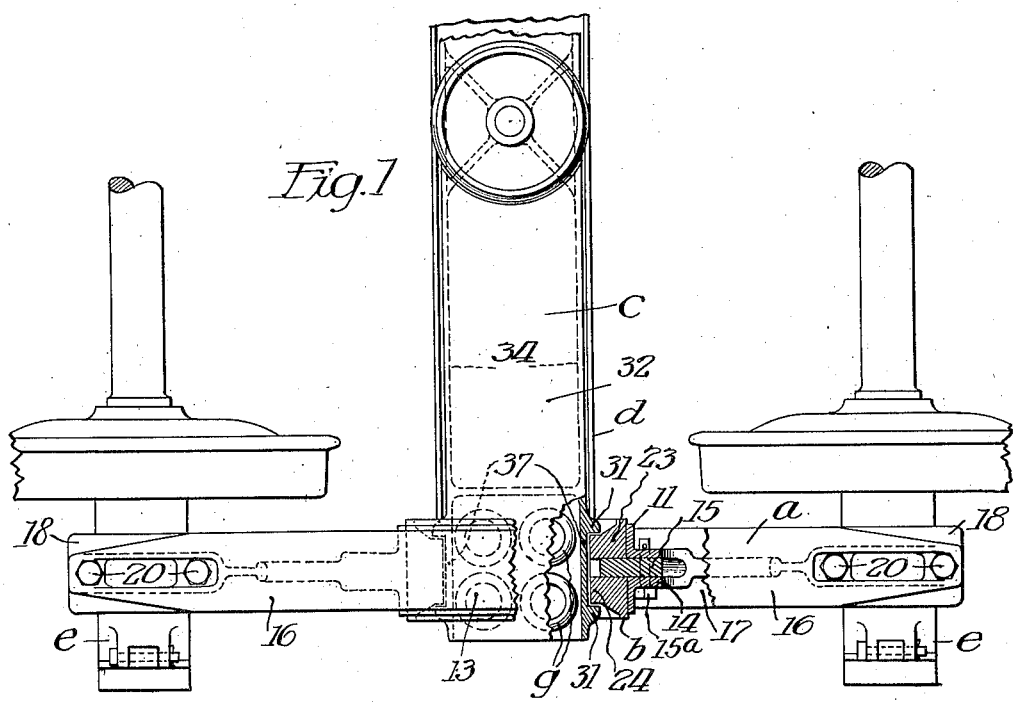
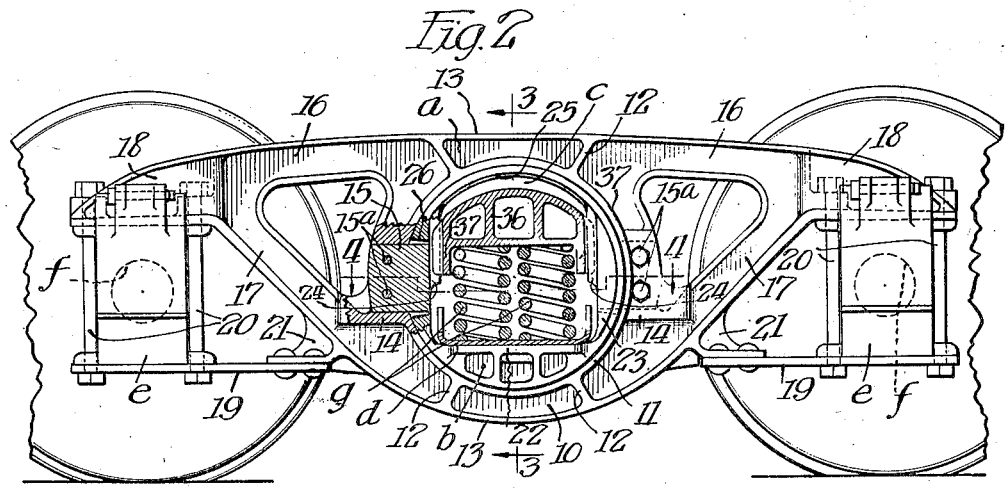
Inventor:
Howard D. Taylor,
By Fisher, Poule, Clapp & Soanye
Attys.

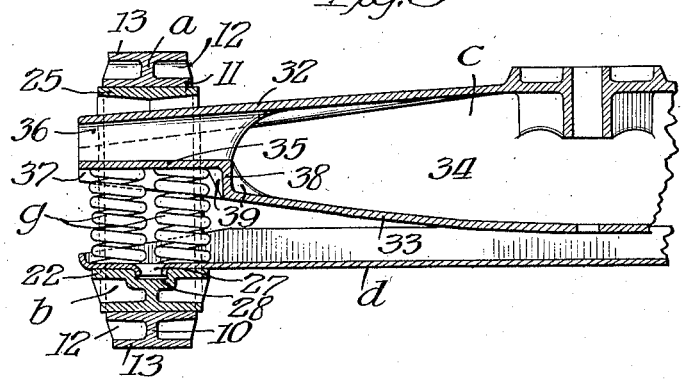
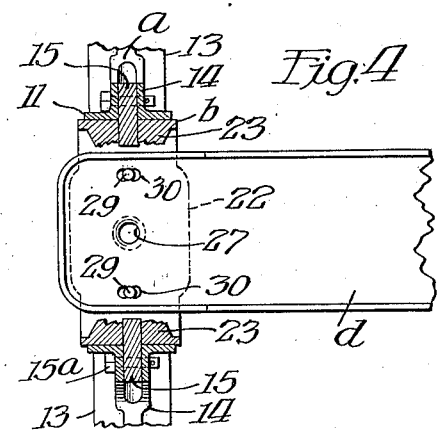
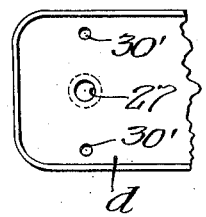
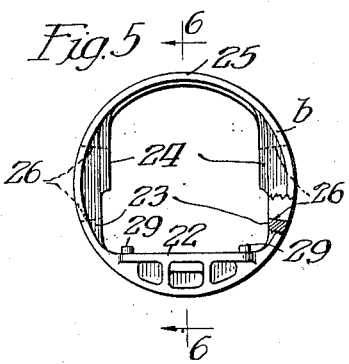
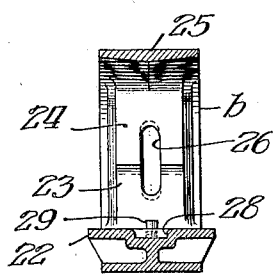

Patented Aug. 3, 1926.

1,594,576

UNITED STATES PATENT OFFICE.

HOWARD D. TAYLOR, OF NEW YORK, N. Y.

CAR TRUCK.

Application filed May 16, 1924. Serial No. 713,675.

The invention relates to car trucks and particularly to that type in which the parts are flexibly connected to permit the wheels to follow irregularities of the track. The invention seeks to provide an improved truck of this type which can be economically manufactured, is of stout construction and can be readily assembled and taken apart.

With these and other objects in view, the invention consists in the features of improvement hereinafter set forth, illustrated in the preferred form in the accompanying drawings and more particularly pointed out in the appended claims.

In the drawings:

Fig. 1 is a plan view of one-half of the improved truck with parts shown in horizontal section.

Fig. 2 is a side view thereof with parts shown in vertical section.

Figs. 3 and 4 are detail sections on the lines 3—3 and 4—4 respectively of Fig. 2.

Fig. 4ª is a detail plan view showing a modified form of spring plank.

Fig. 5 is an elevation of the carrier ring forming part of the side frame of the truck.

Fig. 6 is a section on the line 6—6 of Fig. 5.

The opposite sides of the truck being alike, only one-half of the truck is illustrated. Other parts, not necessary to the understanding of the invention, are not shown.

The side frames $a$ have enlarged central portions provided with a circular bearing opening. Carrier rings $b$ are journaled in the central bearing openings of the side frames and are interlocked therewith in a manner permitting a limited rocking movement of the side frames in vertical planes. The carrier rings are provided with bolster openings within which the ends of bolster $c$ and spring plank $d$ extend, suitable means being provided to interlock the ends of the spring plank and bolster with the carrier rings. Journal boxes $e$, at the ends of the side frames, receive the car axle journals $f$ and are provided with suitable bearings for engaging the journals.

The side frame $a$, in the preferred construction shown, is formed of a single casting, the edges and openings of which are provided with stiffening flanges. The circular bearing opening in the enlarged central portion 10 of the side frame is preferably cylindrical and is bounded by an annular flange 11, the latter being stiffened by short radial flanges 12 extending between it and the marginal flange 13 of the side frame. The web of the side frame is thickened on opposite sides of the central bearing opening and these thickened portions are provided with pockets extending longitudinally of the side frame and preferably in the mid-plane thereof, for receiving keys 15 by which the carrier ring is interlocked with the side frame, these keys being held in place by bolts 15ª.

The center of the bearing opening in the side frame is preferably slightly above the level of the centers of the car axle journals $f$ and the side frame has upper, substantially horizontal, compression members 16 and lower inclined tension members 17 which extend from the enlarged central portion of the side frame and at their ends merge into extensions or arms 18 that rest upon the journal boxes $f$. Preferably, as shown, the upper compression members are curved downwardly to a slight extent from the central portion of the side frame. The extensions or arms 18 are provided with suitable stiffening flanges and the journal boxes $e$ are secured in position between the arms and brace bars 19 by means of bolts 20, the brace bars being riveted at their inner ends to integral lugs 21 on the side frame.

The carrier ring $b$ is preferably cast and has an unbroken, cylindrical periphery or bearing surface having a journal fit within the bearing opening of the side frame. The carrier ring, at the lower end of its bolster opening, is provided with a supporting sill 22 which is preferably somewhat wider than the main body of the ring and suitable stiffening flanges extend between the sills and the outer peripheral portion of the ring. The sides of the ring are thickened to form columns or lugs 23 at opposite sides of the bolster opening and the upper portions of the columns have inwardly projecting guides 24 that merge into the upper arched portion 25 of the ring. The bolster opening extends nearly to the top of the ring and is bounded, at its upper end, by the arched portion 25 thereof. The thickened side portions or columns 23 of the ring have pockets or vertical slots 26 for receiving the inner ends of the keys 15 and these pockets are of such enlarged size that a limited rocking movement of the side frame in a vertical plane is permitted so that the wheels may follow irregularities in the track. However, the engagement of the end walls of the pockets 26 with the ends of the keys serves to limit this movement.

The spring plank *d* is preferably formed of a section of pressed steel plate and has upturned stiffening flanges at its side and end edges and at its rounded corners. Its ends rest upon the sills 22 of the carrier rings and have depending studs 27 which interlock with corresponding sockets 28 centrally formed in the sills. Preferably the studs 27 are hollow and formed by offsetting portions of the metal body of the spring plank. On opposite sides of the socket 28 the sill 22 is provided with upwardly projecting studs 29 which are preferably formed separate from the carrier ring and threaded into suitable pockets or sockets formed in the sill. These studs interlock with corresponding openings formed in the ends of the spring plank and preferably, as shown in Fig. 4, these openings 30 are elongated transversely to a slight extent so that a limited rocking movement of the spring plank in a horizontal plane relative to the side frames, is permitted. This arrangement permits a slight relative longitudinal movement of the side frames of the truck which aids in permitting the truck to follow irregularities in the track. If desired, the opening 30', as indicated in Fig. 4ª, may so fit the corresponding studs 29 of the carrier ring that the connection is substantially rigid.

When the carrier rings are interlocked with the side frames by means of the keys 15 as described, they form in effect parts of the side frames and need not be removed therefrom in assembling or disassembling the truck parts. The bolster opening of the ring frame or that portion thereof between the sill 22 and guide lugs 24, is of sufficient width to receive the ends of the truck bolster and spring plank. In assembling the truck, the end of the bolster is first inserted in the lower portion of the bolster opening and is then raised to bring the projecting ribs or lugs 31 thereof into interlocked relation with the guide lugs 24 of the ring frame. The spring plank is then inserted and interlocked with the sill of the ring frame. The bolster opening is of such height that, by raising the bolster to its upper end, the bolster supporting springs *g* may be inserted, the springs thus serving to maintain the bolster and spring plank in interlocked relation with the carrier ring of the side frame. If desired, each set of bolster springs may be mounted between suitable seats or cap plates. By first lifting the end of the truck bolster and removing the springs the truck parts can be readily disassembled.

The truck bolster is preferably formed of a hollow casting having top, bottom and side walls 32, 33 and 34. The side walls are preferably arranged in vertical planes and the top and bottom walls inclined downwardly and upwardly respectively from the center to the ends of the bolster. To permit sufficient play in the bolster openings of the carrier rings without unduly increasing the size of these openings and of the rings, the ends of the bolster or rather the portions thereof which engage the springs are considerably reduced in height. To this end, the ends of the bottom wall 33 are offset upwardly to form spring-engaging portions or seats 35, and the top wall 32 is arched in section in correspondence with the arched upper end of the bolster opening in the carrier ring. To provide a bolster of proper strength notwithstanding the reduction in size at its ends, stiffening ribs 36 extend between the ends of the top wall 32 and the spring seat 35, and preferably also the top wall is arched from the ends of the bolster to its center bearing, the convexity of this arch gradually increasing from the center bearing to the bolster ends. Also, the side walls 34 are extended to form depending flanges 37 below the spring seat 35. The vertical portions 38 between the seats 35 and inclined bottom walls 33 of the bolster are also provided with stiffening fillets 39

The improved truck can be economically manufactured. The cylindrical bearing surfaces of the side frames and carrier rings can be readily machined and little additional machine work is required. The parts are of stout construction, can be readily assembled and taken apart and are so flexibly connected that they are not subjected to severe strains in passing over irregularities of the track.

Obviously, changes may be made in the details set forth without departure from the essentials of the invention as defined in the claims.

I claim as my invention:

1. A car-truck comprising side frames, carrier rings journaled in said side frames and connected thereto for limited rotation, a bolster having its ends extending through and interlocked with the upper portions of said carrier rings and removable from the lower portions thereof, and springs interposed between the ends of said bolster and the lower portions of said rings and holding the same in interlocked relation, substantially as described.

2. A car-truck comprising side frames, carrier rings having continuous circular bearing surfaces journaled in corresponding central openings in said side frames, keys connecting said frames and rings and permitting the limited rotation of said rings, the latter having guides at their upper side portions and sills at their lower portions, a bolster and a spring plank having ends insertable between the guides and sills of said rings and adapted to interlock with said guides and sills respectively and springs interposed between the ends of said spring plank and bolster and maintaining the same in interlocked relation with said rings, substantially as described.

3. A car-truck comprising a bolster, side frames having bolster openings, bolster springs and a spring plank having its ends resting upon the sills of the bolster openings, said plank and sills having pivot-stud-and-socket connections and additional, motion-limiting, stud-and-socket connections, substantially as described.

4. A car-truck side frame having an enlarged central portion provided with a flanged circular bearing opening, a carrier having a continuous circular bearing surface journaled in said opening, said carrier having a bolster opening arched at its upper end with guide columns and a supporting sill at the sides and lower end respectively of the opening, and keys interlocking the frame and carrier and limiting the relative movement thereof, substantially as described.

5. A carrier ring for car trucks having a continuous, circular, external bearing surface and a bolster opening arched at its upper end with columns and a supporting sill at the sides and lower end respectively of the opening, the upper portions of said columns having inwardly projecting guides, substantially as described.

6. A car-truck including side frames, substantially circular carrier members journaled in said side frames for limited rotation, a bolster having its ends extending through said carrier members and interlocked with the inner and outer faces thereof, and springs interposed between the ends of the bolster and portions of the carrier members to hold the bolster in interlocked relation with the carrier members.

7. A car-truck comprising side frames, carrier rings journaled in said side frames, means retaining said carrier rings in position for limited rotation and co-acting between the side frames and carrier rings, a bolster having its ends extending through and interlocked with portions of said carrier rings and removable from other portions thereof, and resilient means interposed between the ends of the bolster and the rings to hold the bolster in interlocked relation.

8. A car-truck comprising side frames, carrier rings having circular bearing surfaces journaled in corresponding circular openings in said side frames, keys connecting said side frames and rings and permitting limited rotation of said rings, the latter having guides at their upper portions and flat lower portions, a bolster having ends insertable between the guides and lower portions of the rings and held from displacement by said guides at the inner and outer faces of the rings, and springs interposed between the ends of the bolster and flat portions of the rings to maintain the bolster in interlocked relation with the rings.

9. A car-truck comprising side frames, carrier rings having circular bearing surfaces journaled in corresponding bearing openings in said side frames, keys connecting said side frames and rings and permitting limited rotation of said rings, the latter having guides at their upper portions and flat lower portions, a bolster having ends insertable between the guides and lower portions of the rings and adapted to interlock with said rings, and springs between the ends of the bolster and flat portions of the rings to maintain the bolster in interlocked relation with the guides to hold the same from displacement.

10. A car-truck side frame having an enlarged central portion provided with a flanged circular bearing opening, a carrier having a circular bearing surface journaled in said opening, said carrier having a bolster opening arched at its upper end with guide columns and a supporting sill at the sides and lower end respectively of the opening, and keys interlocking the frame and carrier and limiting the relative movement thereof, substantially as described.

11. A carrier ring for car-trucks having a circular, external bearing surface and a bolster opening arched at its upper end with lugs and a supporting sill at the sides and lower end respectively of the opening, the upper portions of said lugs having inwardly projecting guides, substantially as described.

12. In a car-truck, side frames having circular bearing openings, carrier rings mounted in said openings for limited rotation and permitting limited rocking movement of the side frames in vertical planes, means to hold said rings against displacement laterally, a bolster having its ends insertable in the lower portions of the carrier rings and adapted to be raised to the upper portions thereof, means on the rings co-acting with the bolster ends to connect the two when the bolster is raised, a spring plank having its ends insertable in the lower portions of the carrier rings, and springs between the ends of the spring plank and bolster and holding the latter in raised position.

13. A car truck comprising side frames having enlarged central portions provided with cylindrical bearing openings, bolster carriers journaled in said openings and interlocked with said side frames in a manner permitting the relative oscillating movement thereof, said carriers having bolster openings with sills at the lower portions of the openings and inwardly projecting guides at the upper side portions thereof, a bolster having vertically contracted end portions provided with rounded upper surfaces and the bolster ends being insertable between the sills and guides of said carriers and adapted to interlock with said guides, and springs interposed between the sills of the carriers and the ends of the bolster for holding the same in interlocked relation, substantially as described.

14. A car truck comprising side frames having enlarged central portions provided with cylindrical bearing openings, a one-piece bolster carrier journaled in the bearing opening of each side frame, keys connecting the side frames and carriers in a manner permitting the limited relative oscillating movement thereof, said carriers having bolster openings provided with inwardly projecting guides in the upper side portions thereof, a bolster having ends insertable through the lower portions of the openings of the carriers and adapted to interlock with said guides, springs interposed between the ends of the bolster and the lower portions of the carriers for holding the same in interlocked relation, substantially as described.

15. A car truck side frame having an enlarged central portion provided with a cylindrical bearing opening, journal boxes at the ends of said side frame having their axes arranged in a plane below the axis of said opening, a bolster carrier having a cylindrical bearing surface journaled in said opening, said carrier having a bolster opening with a supporting sill at its lower portion and inwardly projecting bolster guides at the upper portions of its sides, and keys interlocking the frame and carrier in a manner permitting the relative oscillating movement thereof, substantially as described.

HOWARD D. TAYLOR.